3,355,309
METHOD AND APPARATUS FOR APPLYING COATINGS ONTO ARTICLES OF MANUFACTURE

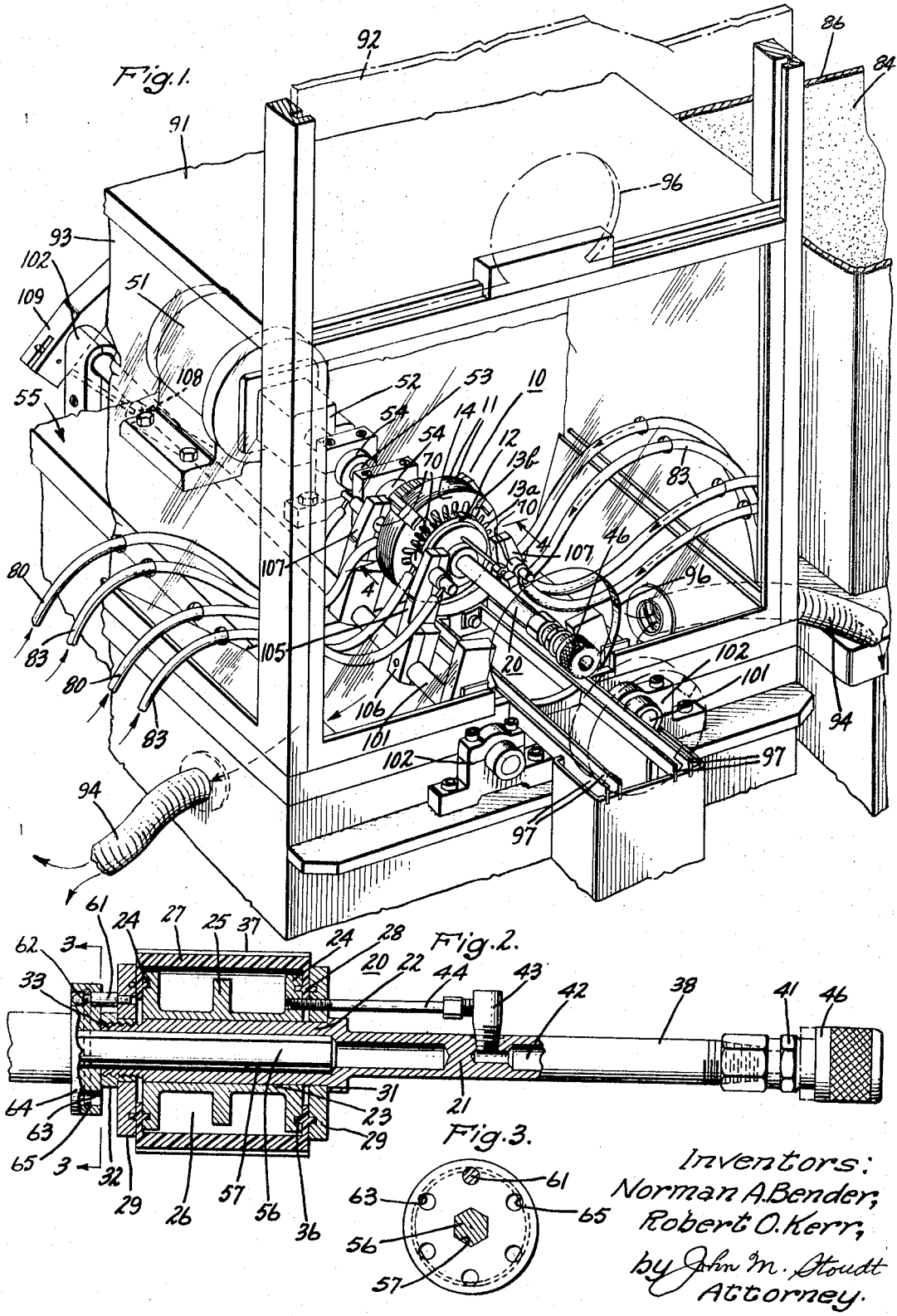

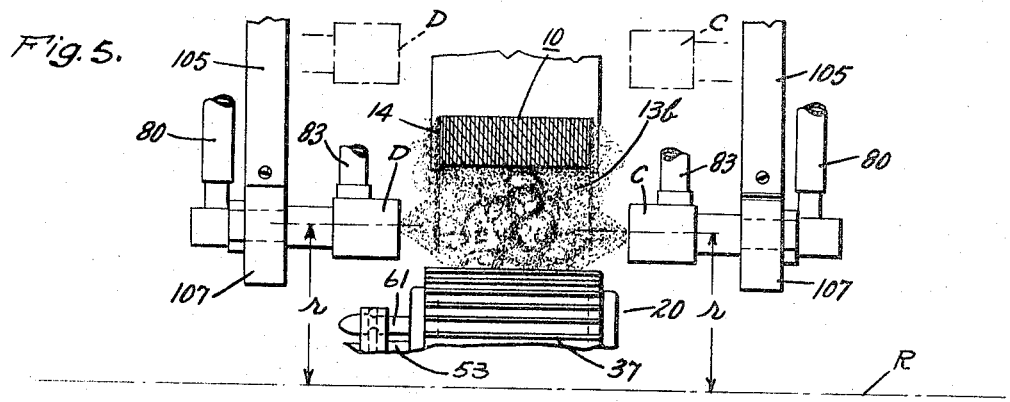
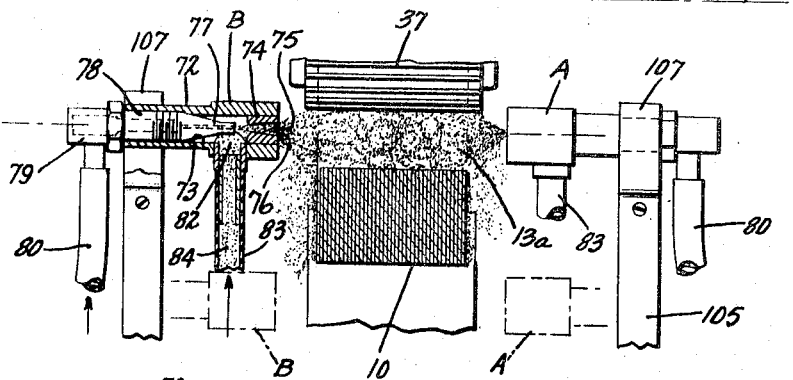
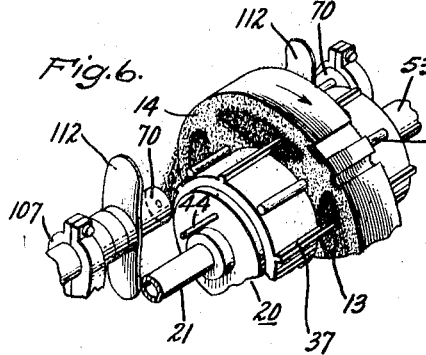
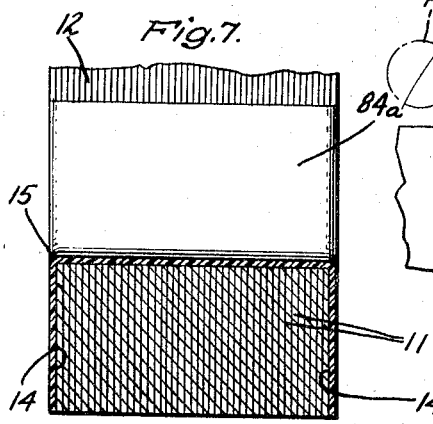
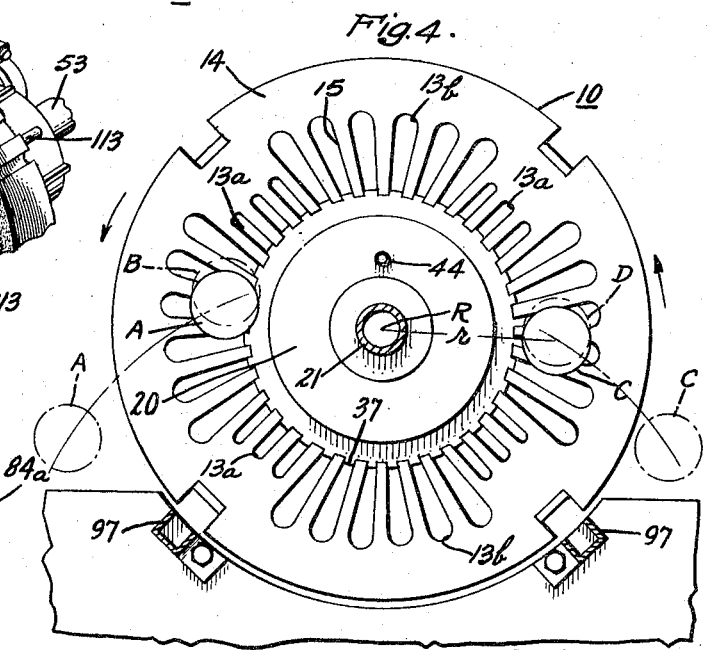

Norman A. Bender and Robert O. Kerr, Fort Wayne, Ind., assignors to General Electric Company, a corporation of New York
Filed July 15, 1963, Ser. No. 295,020
15 Claims. (Cl. 117—18)

This invention relates in general to a method and apparatus for applying coatings on articles of manufacture and more specifically to a method and apparatus of forming an integral layer of insulating material on the desired locations of magnetic cores of electrical inductive devices, such as stator cores for dynamoelectric machines.

Electrical inductive devices, such as dynamoelectric machines, customarily include one or more core members formed on magentic material which are provided with a series of slots for accommodating excitation windings. These windings are ordinarily composed of a number of turns of magnetic wire conductors having a thin covering of insulation. Since the cores conventionally include a stack of thin laminations which have been stamped out of magnetic sheet material, the edges of the laminations, especially at the entrances of the slots on each side face of the core, contain burrs and other sharp projections produced by the stamping operation. The projections, unless properly covered with insulation material, tend to cause breaks in the wire insulation which may ultimately result in short circuit of the wire conductors. In addition, it is necessary to provide a tough and uniformly imperforate ground insulation between the core and the winding which is sufficiently thin in cross-section to permit optimum utilization of slot area for accommodating the sides of the windings, yet will not break down at the maximum temperatures encountered during machine operation. It is also desirable, if not essential, that the ground insulation have high cut-through, mechanical shock, and moisture resistances as well as excellent electrical properties.

One of the most attractive approaches in recent years for providing the ground insulation, from the standpoint of versatility in core manufacture and general product quality, is the one in which an insulating coating material, such as epoxy resin, is applied in powder form onto exposed and heated surfaces of the core. The applied powder material melts, flowing slightly while gelling, and finally hardens into an integral, adherent layer on the pre-heated walls. Commercially available coating materials having the requisite electrical and mechanical properties, mentioned heretofore, normally melt and flow in the temperature range between 190° C. and 232° C. Thus, the core is usually pre-heated at least to a point in the upper part of the temperature range, the precise temperature being dependent upon several factors; e.g., exact material used, the material's deterioration temperature and gellation characteristics, that is, its ability to flow while gelling which is directly affected by the amount of heat being dissipated from the surfaces on which the material has been deposited.

Unfortunately, prior to the present invention, there has been a practical difficulty in forming a completely satisfactory integral insulation layer on the desired locations of the core. In order to properly insulate the windings from the core, for most dynamoelectric machine core applications, the integral layer covering the winding slots, the end faces, and the slot edges at the end faces must have a cross section thickness in the range between 7.5 and 15 mils. An imperforate, uniform, insulating layer 10 mils in thickness is customarily considered to be ideal since it not only provides the requisite mechanical and electrical qualities but also permits optimum utilization of available slot area for accommodating windings, especially critical in cores of short stack lengths (e.g., less than 1.3″) for small and fractional horsepower motors which have slots of irregular configurations and small cross section areas.

In prior coating applying practices and equipment known to us utilizing commercially available epoxy resins, the integral insulating layer formed in the slots varies from a maximum thickness near, but not directly on, the slot edges to a minimum near the center of the core. The variation is normally several mils, and even greater for core slots having unusual wall configurations and small cross-section areas. This, in turn, prevents good utilization of slot areas, even assuming that the minimum 7.5 mils is built up at the center of the slot. Furthermore, the layer covering the slot edges, by past practices, has been in the neighborhood of 45–60% of the average thickness obtained in the slots. Thus, for adequate edge coverage, the layer thickness in the slots must be maintained as great as possible, further reducing the available area for accommodating winding coils.

Other factors which directly affect and influence the type of insulating layer obtained with the commercially available insulating materials, are the rapid rate at which the slot walls and side faces of the core decrease in temperature under ambient conditions and the different heat loss rate between the slot walls at the center of the core and near the core periphery. For instance, in most core constructions for use in small and fractional horsepower motors, the surfaces to be coated at the periphery of the core drop in temperature from 230° C. to less than the minimum 190° C. in slightly over three minutes, depending upon the mass of the core and the total exposed surfaces available for dissipating the heat from the core. In cores with a short stack length (e.g., below 1.3 inch) and a low mass (below three pounds) the same total temperature drop at the core surface to be coated takes place in less than one-half minute. Many past procedures have even increased the already rapid cooling rate of pre-heated cores to a temperature below the critical 190° C., further diminishing the period of time in which the coating material will properly melt and gel into an integral layer. This not only adversely affects the quality and adhesive characteritsics of the layer obtained but also limits the versatility of the procedure in mass production manufacture of the core.

It is therefore a general object of the present invention to provide improved method and apparatus for applying a protective coating on pre-selected locations of a solid article, and a more specific object is the formation by an improved apparatus and method, of an integral layer of insulating material on passageway walls extending through the article and on the edges thereof, such as winding accommodating slots and slot edges of magnetic stator cores for use in electrical inductive devices, such as dynamoelectric machines.

Another object of the present invention is the provision of improved powder applying apparatus and method of forming, from commercially available insulating powder material a generally uniform and improved protective layer on preselected passageways and other surfaces with the features referred to heretofore, taking into consideration the factors and overcoming the difficulties set forth above.

Still another object of the invention is the provision of an improved method, suitable for mass production manufacture, of applying powder insulating material onto heated walls of winding accommodating slots extending axially through a magnetic stator core, side faces and slot edges, the material coalescing into a generally uniform layer, both on the side faces, edges and throughout the length of the core slots.

Yet another object is the provision of an improved method and apparatus for applying powder insulating material on heated surfaces of an article in which an article support serves to hold and rotate the heated article as certain preselected surfaces are being coated and to mask other regions of the article not to be coated without unnecessarily dissipating the heat from the article, with the support being readily dismantled from the article once the coating has been applied.

In carrying out the objects of the present invention in one form thereof, we provide an improved method and apparatus especially suited for forming an adherent, generally uniform and imperforate, continuous insulating layer on the walls of winding accommodate slots, which have entrances in communication with a bore and extend axially through a magnetic stator core and onto the slot edges thereof. Initially, a firm frictional engagement is established between an article holder and a part of the stator core with the holder including extensions projecting into the slot entrances, and the holder and core are then rotated to pass pre-selected surfaces of the core through an arcuate path between a number of powder applying devices positioned adjacent the path. While the surfaces of the core to be coated are heated at least as high as the temperature at which the powder coalesces, a mass of layer forming powder is directed toward the side faces, slots, and slot edges of the core concurrently from at least one powder applying device disposed adjacent each side of the core. One of these devices has an applicator mouth in generally facing, angularly offset, relation to an applicator mouth of one of the devices on the other side of the core slots. The generally opposed mouths and relative rotation between preselected core surfaces and the applicator mouths together provide particle collision of the opposed powder streams near the center of the slots to establish a turbulent flow pattern in the slots for depositing powder in a generally uniform coating on the walls thereof. The angular offset relation supplies powder to a given slot from the respective sides of the core at different angles. This type of powder application and relative rotation establishes the desired turbulent flow pattern in the slot and effects a reduction in the temperature differential along the slot walls. During this action, the extensions aid in the prevention of powder build-up at the slot entrances in the vicinity of the extensions. In addition, a generally uniform coating is formed on the slot edges and on the preselected regions of the side faces of the stator core, the deposited material coalescing and hardening into a substantially uniform, adherent, continuous layer having the desirable qualities and features already mentioned.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawings:

FIG. 1 is a view in perspective of apparatus embodying the preferred form of the present invention;

FIG. 2 is a view, partially in section, of the article support and mask arrangement seen in the apparatus of FIG. 1;

FIG. 3 is a section taken along line 3—3 in FIG. 2;

FIG. 4 is an enlarged section taken along line 4—4 in FIG. 1, illustrating the relative positions of the powder applying devices and the core;

FIG. 5 is an enlarged plan view, partially in section and partially broken away, of portions of the apparatus seen in FIG. 1 showing the preferred manner in which the powder applying devices cooperate to deposit powder in pre-selected slot or passageway walls, edges, and side faces of a magnetic core of the exemplification;

FIG. 6 is a fragmentary view, in perspective, of a stator core constructed with unusually large slots being coated; and FIG. 7 is an enlarged fragmentary view, in section showing the insulating layer formed on the core by the present invention.

Turning now to the drawings in more detail, the preferred form of the present invention is shown by way of exemplification in connection with the formation of an adherent, generally uniform, continuous insulating layer on a pre-heated stator core 10 of the type employed in small or fractional alternating current induction motors. Core 10 comprises a stack of superposed identical laminations 11, suitably stamped out of magnetic material, such as common electrical grade iron, into the desired configuration. Core 10 includes a central annular bore 12 and a number of angularly spaced apart winding accommodating passageways or slots, generally indicated at 13, in communication with the bore and extending axially between end laminations or side faces 14 of the core. These slots are of two general sizes, identified by numerals a and b, with slot entrances or edges 15, which usually include small burrs and the like from the punching operation, disposed at each side face.

The preferred apparatus by which powdered insulating material is applied to the heated walls of core slots 13, side faces 14, and slot edges 15 for achieving a satisfactory protective, adherent, insulating layer is illustrated in FIG. 1. In the preferred embodiment, the apparatus includes a core support or holder assembly 20 which serves to drive the parts of the core to be coated through a predetermined arcuate path past a number of powder applying devices 70, at a pre-selected angular speed, to be fully described hereinafter. Assembly 20 also functions to mask bore 12 of the core where no coating is desired. As shown most clearly in FIG. 2, holder assembly 20 is a portable, self-contained, detachable unit and has an elongated central spindle 21 formed with an enlarged section 22 fixedly mounting cylinder 23, as by an interference fit. Cylinder 23 has integral discs 24 provided at each end and an intermediate disc 25, somewhat smaller in diameter than discs 24. An imperforate, flexible annulus or sleeve member 27, adapted to engage bore 12 of the core, fits over the rims of the discs 24 and surrounds cylinder 23 to define a cavity 26. A flange 28 at each end of member 27 is sandwiched between a side of disc 24 and a washer 29, the parts being retained firmly together in assembled relation between shoulder 31 and nut 32 which threadedly engages spindle end 33. In order to insure a tight, sealing engagement between the parts, each flange 28 may include integral rings 35 suitably accommodated in complementary grooves 36 furnished in the associated sides of disc 24 and washer 29. Preferably, member 27 is formed from material which is not only insensitive to the heat of the pre-heated core and impervious to the layer-forming powder, such as molded silicon rubber, but also has a relatively low thermal conductivity so that it will not unnecessarily conduct heat away from the core which it supports. Flexible sleeve 27 is movable between retracted and inflated or extended positions.

In the retracted position the outer diameter of the member 27 is dimensionally less than the bore diameter of the core to permit easy installation of the core and holder assembly; intermediate disc 25 provides a central support for the core when the assembly is retracted. When expanded, the section of member 27 located between discs 24 is urged tightly against the bore 12 for the entire length. This covers the surface of the bore to mask it and provides a supporting engagement with the core. If desired, a number of axial ribs or radial extensions 37 may be formed on the peripheral surface of the member to fit into and close the slot entrances at the bore for augmenting the firm support and masking of the core in that region. Fluid under pressure, such as air, may be used to move flexible member 27 from the retracted to the extended position. For this purpose, spindle end 38 is furnished with a common quick connect valve 41 for controlling the flow of fluid to and from cavity 26 via spindle passageway 42, elbow 43, and conduit 44, which projects through washer 29 and disc 24 into the cavity. Movement of valve sleeve 46 in an axial direction (toward the left in FIG. 2) opens the valve, allowing it to be connected to a source of fluid pressure (not shown) for expanding flexible member 27 or vented to the atmosphere for discharging the fluid from cavity 26 to deflate the member when removal of the core is desired.

For imparting rotary motion to assembly 20, to drive the core surfaces to be coated through a predetermined arcuate path (to be discussed hereinafter), spindle 21 is detachably connected to a suitable power source, such as an electric motor 51 (FIG. 1) and speed reduction gearing mounted adjacent the motor in casing 52. A driven shaft 53 extends from the casing and is rotatably mounted in bearings 54 carried by platform 55. This shaft terminates in a hexagonally shaped extension 56 which projects into a corresponding recess 57 in enlarged section 22 of spindle 21 to couple the mated components together for rotation. As seen in FIGS. 2 and 3, assembly 20 is locked on shaft extension 56 by a pin 61, fixedly attached at one end to washer 29. The other end of the pin is grooved as at 62, and projects into hole 63 of collar 64, attached to shaft 53, and a resilient ring 65 communicates with hole 63 to enter groove 62 for retaining the pin in place. For ease of assembly the number of holes 63 in collar 64 correspond to the sides of extension 56 so that the pin will always enter a hole, regardless of the relative positions of assembly 20 and extension 56. A sudden axial movement of assembly 20 relative to collar 64 will disengage the pin from the ring, allowing the parts to be readily uncoupled.

Now with specific reference to the powder applying device 70 of the illustrated apparatus, it will be seen from the drawings, especially FIGS. 1 and 5, that two pairs of identical cooperating devices, denoted by letters A, B, and C, D, are employed adjacent the path of travel of pre-selected core regions to be coated. Only one of the devices B is shown in detail for reasons of brevity. As best observed in FIG. 5, each powder applying device 70 comprises a housing 72 formed with an axial channel 73, which extends entirely through the housing and a nozzle insert 74 press fit into the applicator end of the housing channel. A frusto-conical shaped aperture 75 is provided through the insert in communication with a spout 77 of an injector tube 78. This tube is disposed in channel 73 directly behind but in spaced relation to insert 74 and extends beyond the confines of the channel. The largest cross-section of the insert aperture is at its applicator end or mouth 76. At the end of injector tube 78 remote from spout 77 is an air supply port 79 which is connected to a conventional fluid or pressure air supply (not shown) by fluid line 80. A powder supply port 82 is formed in channel 73 in the vicinity of spout 77 and the associated end of nozzle aperture 75, the port being connected by hose 83 to a suitable source of insulating powder or pulverulent 84, such as by way of example, the well known fluidized bed seen in FIG. 1 and identified by numeral 86. With the foregoing construction, powder 84 may be conveniently withdrawn from powder source 86 and fed by Venturi action into the air stream as the air flows from spout 77, past port 82, and into aperture 75. The powder is emitted from nozzle aperture 75 and directed toward core 10 from mouth 76 in the form of a dense mass, the precise manner of application to be described more fully hereinafter.

It will be observed from FIG. 1 that in the illustrated embodiment, the powder applying devices 70 are mounted within an enclosure 91 which has a sliding transparent panel 92 located at the front thereof to permit ready access to the interior of the enclosure. Fluid lines 80 and hoses 83 extend from devices 70, through the side walls 93 of the enclosure, to their respective sources of supply. Suction lines 94 may be employed to return excess powder from the enclosure to the powder supply 86 for reuse. When panel 92 is closed, shown by solid lines in FIG. 1, admittance to the enclosure may be provided through opening 96, which is of sufficient size to allow passage of the core 10 to be coated on holder assembly 20.

Elongated guides 97, adapted to slidably engage the outer peripheral surface of core 10, extend from a location outside of the enclosure to a point near shaft extension 56 for guiding the core and assembly 20 through opening 96 and into coupled relation with shaft 53. Each rail is preferably thin in cross-section so that there is little tendency for powder 84 to build up on the rail edges and interfere with the travel of the core along the rails.

It should be observed at this time that in the illustrated embodiment of the present invention, powder applying devices 70 are arranged within enclosure 91 in cooperating pairs or sets. For reasons to be explained more fully hereinafter, applicator mouths 76 of the pairs of devices designated by letters A and B, and by letters C and D are disposed adjacent each side of the arcuate path through which core slots 13 travel. In addition, the applicator mouths in each cooperating pair are in generally facing relation in their operative positions, shown by the solid lines in FIGS. 4 and 5. In their inoperative positions, the devices are disposed outwardly of the periphery of core 10 (broken lines in the figures) to permit core 10 and assembly 20 to pass freely into and out of coupled relation with shaft 53.

FIG. 1 shows one means which may be conveniently used for supporting devices 70 in their operative positions and for moving the devices between that position and the inoperative one. For example, pair A and B may be mounted to rod 101 which extends parallel to the axis of rotation of core 10, as shown in FIG. 1. The rod is turnably supported outside enclosure 91 by bearing mounts 102. A bracket 105 connects each of devices A and B to rod 101 and includes clamping sections 106 and 107 at its ends. Section 106 attaches the bracket onto the rod while section 107 clamps around the powder applying device, permitting axial adjustment of mouth 76 relative to the core. Any suitable means, such as a hydraulic cylinder 108 and crank arm 109 secured to one end of rod 101, may be utilized to actuate devices A and B from one of the positions to the other. A similar supporting arrangement is shown for the pair of cooperating devices C and D.

The preferred manner in which powder 84 is deposited on pre-selected regions of core 10 by the illustrated apparatus will now be set forth in detail. After the uncoated core has ben pre-heated to the proper temperature, that is, within the correct temperature range where the coating material properly melts, flows, and coalesces (e.g., 190° C. to 232° C.), the core is installed on holder assembly 20 in its retracted position. Valve 41, connected to an air pressure source, is opened and air is admitted to cavity 26 to force flexible member 27 into firm supporting engagement with bore 12 of the core. Holder assembly is then disconnected from the pressure source, the valve being closed to retain pressure inside cavity 26. With devices 70 disposed in their inoperative positions, the core and holder assembly are guided through opening 96 of enclosure 91, past devices 70, by rails 97, and into coupled relation with shaft 53. At this time, devices 70 are actuated to their operative positions, and slots 13 of core 10 (through holder assembly 20, shaft 53 and motor 51 of FIG. 1), are rotated around axis R at a predetermined speed through an arcuate path disposed between each pair of cooperating powder applying devices A, B, and C, D.

The core slots 13 are rotated past mouths 76 at a predetermined speed or with a linear velocity sufficiently low to allow generally unimpeded entrance of the mass of powder into the slots from each side of the core without unnecessarily increasing the already rapid heat loss rate from the core. In other words, no air barrier may be created by the relative movement of core slots 13 with respect to applicator mouths 76 at the slot edges 15 to interfere with the entrance of the mass of powder into the slots, such interference tending to cause, among other things, a build-up of material in thes lots near, but not on, slot edges 15. In addition, the application should be such that air movement is not produced near the slot entrances and core sides sufficiently great to have a significant cooling effect on these surfaces. Further, the nozzle pressures should also be low, preferably between two and six p.s.i. With nozzle pressures over six p.s.i., a decrease in the maximum obtainable coating thickness and an increase in the heat loss of the exposed surfaces of the core occur.

The way in which the generally facing, cooperating pairs of powder applying devices function to deposit the powder on the rotating core may best be understood by reference to FIG. 5. By an important aspect of the present invention, during deposition of the powder, the particles in one powder mass are caused to collide with the particles in the generally opposed stream of the other mass near the axial center of the slots where a powder barrier or resistance to flow of the opposing stream is produced. From actual observation, these colliding particles seem to create a slight turbulence in the slots as shown in FIG. 5. It is believed that due to this collision and ensuing turbulence, the powder is distributed somewhat uniformly all along the heated slot walls. This turbulence also appears to dissipate the centralized heat at the axial center to make the temperature more homogeneous throughout the length of the slots. The heat energy emitted from the core walls causes the powder 84 deposited on the walls to melt and flow slightly. The deposited material gels and coalesces into a generally uniform, imperforate, adherent integral layer, denoted by numeral 84a in FIG. 7.

The ideal relationships and relative rotation or velocity between devices 70 and core slots 13, to derive maximum benefit of the present invention for a given core, will be dependent upon many variables: the extent of the core face to be coated, the slot widths and radial depths, among other things, e.g., total mass and heat sink of the core. However, we have found that, generally speaking, the smaller the slot width of the core, the slower should be the relative speed of rotation between the slots and applicator mouths 76 to permit adequate time for the powder mass to penetrate the slots from either side and collide near the slot centers without appreciably cooling the surfaces to be coated. For cores having unusually large slots, such as the salient pole type stator 10 shown in FIG. 6, each powder applying device 70 may be furnished with a baffle 112 to redirect powder, which may have traveled through the slots, back into the slots, augmenting the requisite powder barrier previously described.

The exact axial distance between each mouth 76 and the associated end face 14 of the core is not particularly critical so long as the mouths are located adjacent the slot edges 15. In actual practice, it has been determined that, regardless of the width of the passageways or slots, when mouths 76 of devices 70 are located closer than 0.25 inch to the core end faces 14, the dense mass flowing toward the core prevents adequate build up on slot edges 15. On the other hand, when the devices are arranged too far away from slot edges 15, that is, over three inches, the axial length of the slots which can be satisfactorily coated is limited.

In coating cores having stack lengths over 1.3 inches, regardless of the size of the solt entrances, it is desirable to offset mouths 76 angularly one from the other (FIG. 4) in each pair of cooperating devices; e.g., 3°. This not only seems to assist in minimizing the temperature differential at the slot walls while enhancing the powder turbulence near the center of the slots, but also improves the coating attained directly behind obstacles which might project outwardly from side face 14, such as winding pins 113 in the stator core of FIG. 6.

Angular displacement between each set of powder applying devices should be such that the deposited powder is given time to melt, flow, and partially coalesce as the core rotates from one set to the other, the coating action of the cooperating pairs complementing each other. Of course, more than the two illustrated sets of devices may be utilized if so desired, especially when coating cores having large diameters. Also, with the use of a greater number of devices 70, a lower total angular travel of the core is required. For instance, with the equipment of the exemplification core 10 need travel through an arc of no more than 370° to obtain a final coating in the slots ten mils in thickness.

Upon completion of the coating operation just described, devices 70 are swung to the inoperative position (the broken lines in the figs.) by actuation of hydraulic cylinder 108, and assembly 20 is uncoupled from shaft 53. The core and holder assembly are removed as a unit from enclosure 91, valve 41 is opened, the air exhausting to the atmosphere from cavity 26, and core 10 is finally dismantled from flexible member 27 which is now in a deflated condition. Since member 27 of holder assembly 20 was constantly maintained below the melting temperature of the powder 84 during the coating operation and was in engagement with bore 12, both bore 12 of core 10 and the outer surface of member 27 are free of an adherent, insulating layer.

The following examples are given merely for the purpose of illustrating more clearly how the present invention has been carried out in actual practice, without necessarily limiting the scope of the invention to the materials and articles mentioned.

*Example 1.*—A number of cores identical with that of the examplification shown in FIGS. 1 through 5 were constructed with the following nominal dimensions:

| | Inches |
|---|---|
| Outer stack diameter | 5.477 |
| Bore diameter | 3.125 |
| Width for slot 13a | 0.14 |
| Maximum width for slot 13b | 0.23 |
| Minimum width for slot 13b (adjacent bore 12) | 0.10 |
| Radial depth of slot 13a | 0.385 |
| Radial depth of slot 13b | 0.636 |

The stack lengths were of various dimensions. Powder 84 was applied to these cores in the manner previously described.

Unusually good results were achieved, both as to quality and uniformity in the layer formed by the deposited powder, when the axis of one set or pair of cooperating applicator mouths 76 (A and B) was arranged in the vicinity of the radial center of the smaller slots 13a and the axis of the set C and D is disposed slightly outwardly from the radial center for the larger slots 13b. In FIG. 5, devices A and B are shown directing powder into smaller slots 13a, with applicator pair C and D directing powder into slots 13b. It was found that in order to obtain optimum advantage of our invention in coating the core of this example, regardless of its axial length, the linear velocity of the core regions passing the center of applicator mouths 76 should be in the range of 0.50 to 0.875 inch per second. Best coating results were obtained when the axis of applicator pairs C, D were at a revolution radius r of 2.07 inches. The core was revolved at approximately 3⅓ revolutions per mintue which provided a linear velocity of 0.719 inch/second ($V=wr$) at the axis of mouth 76. The linear velocity at pairs A and B was 0.625 inch/second.

A number of different powder resins were employed as powder 84. For instance, thermosetting epoxy resins known as "Scotchcast" Brand Resins 260 and XR 5070, both commercially available from Minnesota Mining & Manufacturing Company, St. Paul Minn., were used. Also a synthetic polyester resin of the type described and claimed in U.S. Patent No. 2,936,296, Precopio and Fox, assigned to the General Electric Company was used. This however required a post cure to harden the deposited material. Layer 84a obtained with these materials was fairly uniform throughout the slots and on end face 14 at ten mils while coverage on the edges 15 was between 90 and 110 percent of the ten mil thickness, far superior to that achieved by prior equipment and procedures known to us. Moreover, layer 84a was imperforate (void free) and adhered well to the walls of the core.

*Example II.*—A number of stator cores 10 of varying stack lengths of the salient pole type, shown in FIG. 6 where like numbers identify like parts, were also coated in accordance with the present invention as outlined above. The nominal dimensions were as follows:

|  | Inches |
|---|---|
| Outer core diameter | 4.790 |
| Bore diameter | 2.651 |
| Maximum slot width 13 | 2.204 |
| Radial slot depth | 0.700 |

The core was rotated past devices 70 at twelve r.p.m. and a radius $r$ of 1 13/16 inch to produce a linear velocity of 2.28 inches/second. This seemed to produce best results with this type of slot construction, although satisfactory results were achieved below a linear velocity of three inches/second. The resins mentioned in Example I were used in Example II as well as thermosetting epoxy resin EPX–24A, available from Polymer Processes, Inc. of Reading, Pa. The same type of quality layer 84a was produced as that in Example I.

Stator cores having outer diameters, slot widths, and configurations other than those specified above were also coated with the above materials in accordance with the present invention to form layer 84a having the same satisfactory adhesion and uniformity of thickness qualities achieved in connection with the cores of Examples I and II. Thermosetting epoxy resin No. 650, available from Michigan Chrome and Chemical Co. of Detroit, Mich., in powder form was also employed as the coating material. Far superior coating results occurred, regardless of the coating material involved, when the linear velocity at the axis of the applicator mouth 76 relative to the core was maintained between 0.50 and 3.0 inches/second, the precise velocity for a given core being dependent primarily upon the width and edge or wall configuration of the slots. Further, the mass of powder was directed from devices 70 toward slots 13 at a low velocity (e.g., nozzle pressure between two and six p.s.i.) in the manner previously set out.

Although the invention has been illustrated in connection with two types of stator cores, it is of course applicable to a diversity of different articles capable of being pre-heated, e.g., rotor and transformer cores, having longitudinally extending passageway walls which require a protective generally uniform adherent layer of material.

It will be appreciated from the foregoing that the improved apparatus and method above disclosed is capable of forming an improved integral layer of protective insulating material on pre-selected locations of solid articles, such as the walls of longitudinal passageways, end faces, and edges, of magnetic cores. This layer can be made generally uniform and imperforate throughout its entire extent with the use of commercially available powdered resins which melt and gel in the temperature range of 190° C. to 232° C. In addition, by the present invention, this protective layer may be formed in a short period of time without unnecessarily increasing the already rapid heat loss of the pre-heated article being coated while minimizing the temperature differential normally existing between the center of the passageways and the ends thereof. A superior layer, both as to adhesion of the layer on the core walls and uniformity in layer thickness is thereby obtained. Furthermore, the foregoing advantages and features are achieved by a process and apparatus which permit versatility and economy in the mass production manufacture of cores and the like.

While in accordance with the patent statutes, we have described what at present is considered to be the preferred embodiment of our invention, it will be obvious to those skilled in the art that numerous changes and modifications may be made therein without departing from the invention and it is therefore aimed in the appended claims to cover all such equivalent variations as fall within the true spirit and scope of the invention.

What we claim as new and desire to secure by Letters Patent of the United States is:

1. A method of forming an adherent integral layer of insulating material on the walls of winding accommodating slots extending axially through a core for use in dynamoelectric machines and on the slot edges at each side of the stator core, with the stator core having slot entrance walls in communication with a peripheral surface thereof, the method comprising the steps: mounting the stator core on a support having axial ribs extending between the slot entrance walls; intiating relative rotation between powder applying devices and the stator core while the surfaces to be coated are heated at least as high as the temperature at which the powder to be applied coalesces; directing a mass of insulating layer-forming powder toward the side faces and slot edges of the stator core during said relative rotation concurrently from at least one powder applying device adjacent each side of the stator core, with the ribs aiding in the prevention of powder buildup on the slot entrance walls adjacent to the ribs and with the direction of application from one side being in generally facing relation to the direction of application of one of the devices on the other side to establish a flow pattern within the slots for depositing the powder in a coalesced coating thereon; and hardening the coalesced coating into an adherent, integral layer covering the slot walls and edges.

2. The method of claim 1 in which the stator core is of the salient pole type and at least some of the powder which has traveled entirely through the slots is redirected back into the slots by means disposed adjacent the powder applying devices on at least one side of the stator core as the mass of insulating layer-forming powder is concurrently being directed into the slots.

3. A method of forming an adherent integral layer of epoxy resin insulating material on the walls of windnig accommodating slots extending axially through a stator core for use in a dynamoelectric machine and on the slot edges at each side of the core, with the winding accommodating slots having entrances in communication with a bore of the stator core, the method comprising the steps: mounting the stator core on a support having extensions projecting into the slot entrances; rotating powder applying devices and the stator core relative to one another while the surfaces to be coated are heated at least as high as the temperature at which epoxy resin in powdered form to be applied coalesces; directing a mass of insulating layer-forming powedred epoxy resin toward the slots and slot edges of the stator core during said relative rotation concurrently from at least one powder applying device adjacent each side of the stator core, the direction of application from one side being in generally facing, angularly offset, relation to the direction of application of one of the devices on the other side, with the application and relative rotation supplying powdered epoxy resin to a given slot from the respective sides of the stator core at different angles and establishing a turbulent flow pattern within the slots for depositing the powdered epoxy resin in a coalesced coating thereon, with the extensions aiding in the prevention of powder buildup on the slot entrances adajcent the extensions and with the offset relation effecting a reduction in temperature differential along the individual slot walls; and hardening the coalesced coating into an adherent, integral layer covering the slot walls and edges.

4. A method of forming an adherent integral layer of insulating material on the walls of winding accommodating slots having entrances at a bore and extending axially through a dynamoelectric machine magnetic stator core, on the side faces, and on the slot edges at each side of the core, the method comprising the steps: rotating a part of the stator core past powder applying devices at a linear velocity generally in the range of 0.50 to 3.0 inches/second while the surfaces to be coated are pre-heated at least as high as the temperature at which the powder coalesces, and while a support extends into the bore having extensions projecting into the slot entrances; directing a mass of insulating layer-forming powder toward the side faces and slot edges of the core during the core rotation concurrently from at least one powder applying device adjacent each side of the core, the direction of application from one side being in generally facing, angularly offset, relation to the direction of application of one of the locations on the other side to establish a turbulent flow pattern within the slots for depositing the powder in a generally uniform coalesced coating thereon as the extensions projecting into the slot entrances aid in the prevention of powder buildup on walls of the slot entrances in the vicinity of the extensions; and hardening the coating after it has coalesced into a generally uniform, adherent, integral layer covering the exposed side faces, slot walls and slot edges.

5. A method of forming an adherent integral layer of insulating material on the walls of winding accommodating slots extending axially through a dynamoelectric machine magnetic stator core, the side faces, and the slot edges at each side of the core, the core having slot entrance walls in communciation with a peripheral surface of the core, the method comprising the steps: placing the stator core on a support having extensions with the extensions projecting between next adjacent slot entrance walls, rotating a part of the stator core past powder applying devices disposed on either side thereof, at a linear velocity generally in the range of 0.50 to 3.0 inches/second while the walls to be coated are heated at least as high as the temperature at which the powder coalesces; directing a mass of insulating layer-forming powdered material toward the side faces, slots, and slot edges of the stator core during the stator core rotation concurrently, from at least one powder applying device adjacent each side of the core; the direction of application from one side being in generally opposed relation to the direction of application from the other side, with the stator core rotation and direction of application establishing powder collision within the slots for depositing the powdered material in a generally uniform coalesced coating thereon, and with the extensions aiding in the prevention of powdered material buildup on the slot entrance walls in the vicinity of the extensions; and hardening the powdered material after it has coalesced into a generally uniform, adherent, integral layer covering the walls to be coated.

6. A method of forming an adherent, continuous, insulating layer on the walls of winding accommodating slots extending axially through a salient pole stator core and on the slot edges at each side of the core, the method comprising the steps: establishing a firm frictional engagement between a holder and a part of the salient pole stator core, rotating the holder to drive preselected surfaces of the salient pole stator core through an arcuate path between powder applying devices located adjacent said path while the surfaces to be coated are heated at least as high as the temperature at which the powder coalesces; directing a mass of insulating layer-forming powder toward the side faces, slots, and slot edges of the salient pole stator core as the preselected surfaces move through said path concurrently from at least one powder applying device disposed adjacent each side of the core at said path, the direction of application from one side being in generally facing and opposed relation to the direction of application of one of the devices on the other side, with the application and rotation establishing a turbulent flow pattern within the slots to deposit the powder in a generally uniform coating thereon and with the holder preventing the formation of a layer on the part of the salient pole stator core engaged thereby; and redirecting powder traveling axially through the slots back into the slots by baffle means for effecting a powder barrier adjacent the sides of the slots and for reducing powder losses while concurrently augmenting the turbulent flow pattern within the slots; and hardening the powder after it coalesces into a substantially uniform, adherent, continuous layer covering the slot walls, slot edges, and side faces adjacent said edges.

7. A method of forming an adherent, continuous, insulating layer of epoxy resin on the walls of winding accommodating slots extending axially through a magnetic stator core and on the slot edges at each side of the stator core, with the winding accommodating slots having slot entrance walls in communication with a bore of the core, the method comprising the steps: placing an annular holder having angularly spaced apart axial ribs into the bore of the core and establishing a firm frictional engagement at least between portions of the ribs and the slot entrance walls; rotating the holder to drive preselected surfaces of the core through an arcuate path between powder applying devices located adjacent said path while the surfaces to be coated are pre-heated at least as high as the temperature at which the epoxy resin coalesces; directing a mass of insulating layer-forming epoxy resin in powder form toward the side faces and slot edges of the core during movement of the preselected surfaces through said path concurrently from at least one powder applying device disposed adjacent each side of the core at said path, the direction of application from one side being in generally facing and opposed relation to the direction of application of one of the devices on the other side to establish a turbulent flow pattern within the slots to deposit the epoxy resin in a generally uniform coating on exposed winding accommodating portions as the ribs prevent epoxy resin buildup where they frictionally engage the slot entrance walls; and hardening the epoxy resin after it has coalesced into a substantially uniform, adherent, continuous layer covering the slot walls, slot edges, and side faces adjacent said edges.

8. A method of forming an adherent, protective, integral layer from powder material on the walls of passageways having entrances at a bore and extending axially through a dynamoelectric machine stator core and on the passageway edges at each side of the stator core, the method comprising the steps: establishing relative rotation between powder applying devices and the stator core while the walls to be coated are heated at least as high as the temperature at which the powder material to be applied coalesces and while ribs are disposed in the slot entrances; directing a mass of layer-forming powder material toward the passageways of the stator core during said relative rotation concurrently from at least one powder applying device adjacent each side of the article, the direction of application from one side being in generally facing relation to the direction of application of one of the devices on the other side to create powder material collision within each passageway for depositing the powder on the walls thereof, with the ribs disposed in the slot entrances, and as the mass of layer-forming powder material is directed toward the passageways, creating a powder barrier on either side of the slots in the vicinity of the powder applying devices thereby effecting return of at least some of the powder material which might have traveled axially through the slots; and coalescing and hardening the powder material into an adherent, integral protective layer covering the passageway walls and edges.

9. In an apparatus for applying a mass of solid powder insulating material, which coalesces when heated into an adherent integral protective layer, onto heated walls of winding accommodating slots having slot entrances adjacent a bore and extending axially through a magnetic stator core and on the slot edges at each side of the stator core; an assembly having means for concurrently supporting and rotating the stator core while masking a part of the stator core including selected surfaces of the slot entrances and adjacent bore not to be coated, said assembly being expandable between a retracted position in which the stator core may be moved relative to the assembly means and an expanded position in which a part of the core including portions of the slot entrances is frictionally engaged by said assembly means, said assembly means being insensitive to the heat of the core, means including a valve connected to said assembly for controlling the flow of fluid toward and away from said assembly to operate said assembly means between said retracted and expanded positions and to maintain said assembly means in said expanded position; means for rotating the assembly in the expanded position when the core is supported thereon; and a plurality of powder applying devices mounted adjacent said assembly in spaced relation with one another for directing powder toward the side faces and slots of the core as said assembly and core rotate, at least one powder applying device on one side of the core having an applicator mouth in generally angularly offset, opposed relation to an applicator mouth of one of said devices disposed on the other side of the core, said generally opposed mouths establishing a turbulent flow pattern in the slots for depositing powder in a generally uniform coating on the walls thereof.

10. In an apparatus for applying a mass of solid powder insulating material, which coalesces when heated into an adherent integral protective layer, onto heated walls of winding accommodating passageways extending axially between side faces of a stator core for use in a dynamoelectric machine, the passageways having entrance walls in communication with a peripheral surface of the stator core; an assembly having extensions for projecting into engagement with the passageway entrance walls; a plurality of powder applying devices mounted adjacent said assembly in spaced relation with each other for directing powder toward the passageways from adjacent each side face of the stator core, at least one powder applying device on one side of the core passageways having an applicator mouth in generally opposed relation to an applicator mouth of one of the devices disposed on the other side of the core passageways; means for rotating said assembly between the generally opposed applicator mouths of said powder applying devices with the assembly extensions assisting in driving the core passageways therebetween, said generally opposed mouths and relative rotation establishing a turbulent flow pattern in the passageways for depositing powder in a generally uniform coating on the walls thereof, with said assembly extensions assisting to prevent the deposition of powder in the region of engagement with the stator core.

11. In an apparatus for applying a mass of solid powder insulating material, which coalesces when heated into an adherent integral protective layer, onto heated walls of passageways extending through a stator core; assembly means for supporting the stator core as it is heated to a preselected temperature and for extending into the passageways to aid in the prevention of powder buildup on selected portions of the passageways; a plurality of powder applying devices mounted adjacent the assembly means in spaced relation with each other for directing powder toward the entrances of the stator core passageways; means for rotating the assembly means and powder applying devices relative to one another, at least one powder applying device mounted on one side of the stator core having an applicator mouth in generally facing relation to an applicator mouth of one of the devices disposed on the other side of the stator core, said generally facing mouths and relative rotation establishing a turbulent flow pattern in the passageways for depositing powder in a generally uniform coating on the walls thereof as the assembly means and powder applying devices are being rotated relative to one another.

12. The apparatus of claim 11 in which the powder applying devices each comprise a generally elongated assembly having a longitudinal passageway therein terminating at one end thereof in the applicator mouth, said devices each having an opening to said longitudinal passageway extending transversely through said elongated assembly in spaced relation to said mouth for admitting fluid thereto, and a powder coating entrance communicating with said longitudinal passageway formed in said elongated assembly intermediate said fluid opening and said applicator mouth for transfering powder coating material to said longitudinal passageway whereby fluid enters the longitudinal passageway through said fluid opening and passes over said powder entrance to draw powder therethrough into said longitudinal passageway, the fluid conveying the powder through and beyond said applicator mouth in a powder stream with a regulated rate of flow.

13. The apparatus of claim 10 for applying the mass of solid powder onto heated walls of a salient pole type stator in which baffle means are mounted adjacent at least one pair of generally opposed powder applying devices for returning powder traveling axially through the stator core passageways back into the stator core passageways and for creating a powder barrier adjacent the stator core passageways.

14. In an apparatus for applying a mass of solid powder insulating material, which coalesces when heated into an adherent integral protective layer, onto heated walls of axially extending passageways of a stator core having a bore in communication with the passageways and on the passageway edges at each side thereof, an enclosure, means including an assembly projecting into the bore and a part of the passageways for supporting the stator core within said enclosure, a plurality of powder applying devices mounted within said enclosure in spaced relation with the stator core for directing powder toward the passageways, at least one powder applying device mounted on one side of the stator core having an applicator mouth in generally facing, opposed relation to an applicator mouth of one of the devices disposed on the other side of the stator core, means for rotating said support and powder applying devices relative to one another at a linear velocity generally in the range of 0.50 to 3.0 inches per second, said generally facing mouths and relative rotation establishing a turbulent flow pattern in the passageways for depositing powder in a generally uniform coating on the walls thereof, with the supporting means tending to aid in control of powder build-up on adjacent parts of the stator core thereto, and means for collecting excess powder for reuse.

15. An apparatus for applying powder insulating material, which coalesces when heated to a predetermined temperature into an adherent integral protective layer, onto heated walls of winding accommodating passageways having entrances at a bore and extending axially between side faces of a stator core for use in a dynamoelectric machine; at least one set of powder applying devices mounted in spaced apart relation having applicators generally facing one another for directing powder toward the respective side faces and winding accommodating passageways of the stator core; means including an assembly extending into the bore and into the passageway entrances for rotating the stator core between the powder applying devices of the at least one set at a preselected linear velocity as powder is being directed toward the side faces and winding accommodating passageways from the at least one set of powder applying devices to establish a turbulent flow pattern in the winding accommodating passageways for depositing powder on the walls thereof, with said assembly aiding in the prevention of powder build-up in the bore and passageway entrances adjacent the assembly as it rotates the stator core between the powder applying devices; and means for maintaining fluid in communication with the assembly as the assembly rotates the stator core between the powder applying devices of the at least one set.

References Cited

UNITED STATES PATENTS

| | | | |
|---|---|---|---|
| 2,151,427 | 3/1939 | Houk | 118—505 |
| 2,336,946 | 12/1943 | Marden et al. | 117—18 |
| 2,363,843 | 11/1944 | Duggan | 91—65 |
| 2,363,845 | 11/1944 | Duggan | 96—65 |
| 3,016,875 | 1/1962 | Ballentine et al. | 117—18 X |
| 3,025,188 | 3/1962 | Larsh et al. | 117—230 |
| 3,028,266 | 4/1962 | Larsh | 117—232 |
| 3,034,479 | 5/1962 | Larsh et al. | 118—406 |
| 3,074,808 | 1/1963 | Harrison | 117—18 X |
| 3,093,510 | 6/1963 | Olson et al. | 117—18 X |
| 3,136,650 | 6/1964 | Avila | 117—21 |
| 3,167,454 | 1/1965 | Tompson | 118—425 |
| 3,185,131 | 5/1965 | Manning | 117—21 X |
| 3,226,245 | 12/1965 | Dettling et al. | 117—21 |
| 3,233,584 | 2/1966 | Angstadt | 118—429 |
| 3,247,004 | 4/1966 | Dosser | 117—18 |
| 3,261,707 | 7/1966 | Korski | 117—25 X |
| 3,291,630 | 12/1966 | Deyle et al. | 117—21 X |

WILLIAM D. MARTIN, *Primary Examiner.*

P. F. ATTAGUILE, *Assistant Examiner.*